United States Patent
Uchida et al.

(10) Patent No.: US 10,444,612 B2
(45) Date of Patent: Oct. 15, 2019

(54) PROJECTION OPTICAL SYSTEM AND IMAGE PROJECTION DEVICE FOR PROJECTING AN IMAGE LIGHT FLUX ONTO A PROJECTION SURFACE

(71) Applicant: Panasonic Intellectual Property Management Co., Ltd., Osaka (JP)

(72) Inventors: Tsuneo Uchida, Kanagawa (JP); Katsu Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/906,365

(22) Filed: Feb. 27, 2018

(65) Prior Publication Data
US 2018/0188507 A1    Jul. 5, 2018

Related U.S. Application Data

(63) Continuation of application No. PCT/JP2017/011303, filed on Mar. 22, 2017.

(30) Foreign Application Priority Data

Jul. 4, 2016  (JP) .................................. 2016-132128

(51) Int. Cl.
*G03B 21/28* (2006.01)
*G02B 13/16* (2006.01)
(Continued)

(52) U.S. Cl.
CPC ............. *G03B 21/28* (2013.01); *G02B 13/16* (2013.01); *G02B 17/08* (2013.01); *G03B 21/00* (2013.01);
(Continued)

(58) Field of Classification Search
CPC ........ G02B 13/16; G02B 17/08; G03B 21/28; G03B 21/14; G03B 21/147
See application file for complete search history.

(56) References Cited

U.S. PATENT DOCUMENTS 6,631,994 B2 * 10/2003 Suzuki ..................... G02B 5/09
                                                                      348/E5.137
6,994,437 B2 *  2/2006 Suzuki ..................... G02B 5/09
                                                                      348/E5.137
(Continued)

FOREIGN PATENT DOCUMENTS

JP    2009-157223    7/2009
JP    2011-242606    12/2011
(Continued)

OTHER PUBLICATIONS

International Search Report dated Jun. 20, 2017 in International (PCT) Application No. PCT/JP2017/011303.

*Primary Examiner* — Bao-Luan Q Le
(74) *Attorney, Agent, or Firm* — Wenderoth, Lind & Ponack, L.L.P.

(57) ABSTRACT

A projection optical system is an optical system for projecting an image light flux formed in an image display element onto a projection surface, and includes a transmission optical system and a reflection optical system. The transmission optical system is located on an emission surface side of the image display element and includes a stop and a plurality of lenses. The reflection optical system includes a positive-power first mirror and a second mirror. Conditional Expression (1) is satisfied $$0 < TL/ft < 10 \qquad (1)$$

where
ft is a focal length of the transmission optical system, and
TL is a distance parallel to an optical axis of the transmission optical system from a position where the first mirror reflects a principal ray of the image light flux, to the image display element.

11 Claims, 4 Drawing Sheets

(51) Int. Cl.
*G02B 17/08* (2006.01)
*G03B 21/00* (2006.01)
*G03B 21/14* (2006.01)
*H04N 5/74* (2006.01)
*G02B 13/18* (2006.01)

(52) U.S. Cl.
CPC .............. *G03B 21/14* (2013.01); *H04N 5/74* (2013.01); *G02B 13/18* (2013.01)

(56) References Cited

U.S. PATENT DOCUMENTS

| | | | | |
|---|---|---|---|---|
| 7,048,388 B2* | 5/2006 | Takaura | ................. | G02B 13/16 353/102 |
| 7,441,908 B2* | 10/2008 | Takaura | ................. | G02B 13/16 353/102 |
| 7,448,760 B2* | 11/2008 | Yamagishi | ............. | G03B 21/10 348/E5.139 |
| 7,631,975 B2* | 12/2009 | Takaura | ................. | G02B 13/16 353/102 |
| 7,637,618 B2* | 12/2009 | Takaura | ................. | G02B 13/16 353/102 |
| 7,637,621 B2* | 12/2009 | Takaura | ................. | G02B 13/16 353/102 |
| 7,922,341 B2* | 4/2011 | Takaura | ................. | G02B 13/16 353/102 |
| 7,938,545 B2* | 5/2011 | Takaura | ................. | G02B 13/16 353/70 |
| 7,946,717 B2* | 5/2011 | Abe | ................. | G02B 17/08 353/122 |
| 7,950,806 B2* | 5/2011 | Imaoka | ................. | G03B 21/62 353/69 |
| 8,025,415 B2* | 9/2011 | Abe | ................. | G02B 17/08 353/102 |
| 8,107,163 B2* | 1/2012 | Nishikawa | ............. | G02B 17/08 359/364 |
| 8,113,667 B2* | 2/2012 | Yamada | ............. | G02B 17/0816 353/101 |
| 8,210,693 B2* | 7/2012 | Nishikawa | ............. | G03B 21/28 353/122 |
| 8,254,039 B2* | 8/2012 | Fujita | ................. | G02B 17/08 353/98 |
| 8,425,044 B2* | 4/2013 | Yamada | ................. | G03B 21/005 353/30 |
| 8,511,837 B2* | 8/2013 | Takahashi | ............. | G03B 21/14 348/782 |
| 8,657,450 B2* | 2/2014 | Abe | ................. | G03B 21/28 353/70 |
| RE45,258 E* | 11/2014 | Takaura | ................. | G02B 13/16 353/102 |
| 8,905,550 B2* | 12/2014 | Takahashi | ............. | G02B 17/08 353/78 |
| 8,922,883 B2* | 12/2014 | Tatsuno | ................. | G02B 17/08 359/364 |
| 8,950,874 B2* | 2/2015 | Tatsuno | ................. | G02B 17/08 353/99 |
| 8,985,786 B2* | 3/2015 | Fujioka | ............. | G03B 21/2066 353/119 |
| 9,039,196 B2* | 5/2015 | Hirakawa | ............. | G03B 21/28 353/73 |
| 9,069,238 B2* | 6/2015 | Nishina | ................. | G03B 21/28 |
| 9,091,908 B2* | 7/2015 | Yamada | ................. | G03B 21/145 |
| 2004/0156117 A1* | 8/2004 | Takaura | ................. | G02B 13/16 359/651 |
| 2006/0126032 A1* | 6/2006 | Takaura | ................. | G02B 13/16 353/99 |
| 2006/0132723 A1* | 6/2006 | Yamagishi | ............. | G03B 21/10 353/98 |
| 2006/0227299 A1* | 10/2006 | Hisada | ................. | G02B 13/16 353/77 |
| 2008/0068563 A1* | 3/2008 | Abe | ................. | G02B 17/08 353/98 |
| 2008/0068564 A1* | 3/2008 | Abe | ................. | G02B 17/08 353/98 |
| 2008/0158439 A1* | 7/2008 | Nishikawa | ............. | G02B 17/08 348/744 |
| 2008/0158518 A1* | 7/2008 | Imaoka | ................. | G03B 21/28 353/70 |
| 2008/0304019 A1* | 12/2008 | Takaura | ................. | G02B 13/16 353/38 |
| 2009/0015801 A1* | 1/2009 | Takaura | ................. | G02B 13/16 353/99 |
| 2009/0015910 A1* | 1/2009 | Takaura | ................. | G02B 13/16 359/364 |
| 2009/0021703 A1* | 1/2009 | Takaura | ................. | G02B 13/16 353/99 |
| 2009/0168031 A1* | 7/2009 | Imaoka | ................. | G02B 13/16 353/99 |
| 2010/0039625 A1* | 2/2010 | Takaura | ................. | G02B 13/16 353/70 |
| 2010/0053737 A1* | 3/2010 | Fujita | ................. | G02B 17/08 359/364 |
| 2010/0097581 A1* | 4/2010 | Yamada | ................. | G02B 17/08 353/70 |
| 2010/0118281 A1* | 5/2010 | Yamada | ............. | G02B 17/0816 353/70 |
| 2010/0245784 A1* | 9/2010 | Nishikawa | ............. | G02B 17/08 353/99 |
| 2011/0038039 A1* | 2/2011 | Takaura | ................. | G02B 13/16 359/364 |
| 2012/0019791 A1* | 1/2012 | Abe | ................. | G03B 21/28 353/99 |
| 2012/0092628 A1* | 4/2012 | Takahashi | ............. | G03B 21/14 353/82 |
| 2013/0070217 A1* | 3/2013 | Tatsuno | ................. | G02B 17/08 353/99 |
| 2013/0235356 A1* | 9/2013 | Takahashi | ............. | G02B 17/08 353/99 |
| 2014/0132935 A1* | 5/2014 | Kim | ................. | G03B 21/10 353/79 |
| 2014/0268073 A1* | 9/2014 | Takano | ............. | G02B 13/0065 353/99 |
| 2015/0138625 A1* | 5/2015 | Tatsuno | ................. | G02B 17/08 359/292 |

FOREIGN PATENT DOCUMENTS

| | | |
|---|---|---|
| JP | 2013-174886 | 9/2013 |
| JP | 2013-242594 | 12/2013 |
| JP | 2015-38633 | 2/2015 |
| WO | 2016/125681 | 8/2016 |

\* cited by examiner

PROJECTION OPTICAL SYSTEM AND IMAGE PROJECTION DEVICE FOR PROJECTING AN IMAGE LIGHT FLUX ONTO A PROJECTION SURFACE

TECHNICAL FIELD

The present disclosure relates to an image projection device that projects an image generated by an image display element through a projection optical system.

BACKGROUND ART

PTL 1 discloses a projection device in which a projection optical system including a reflection surface is used. The projection device is a projection optical system that magnifies and projects an image formed in a light valve onto a projection surface, and the projection device includes a plurality of lenses. The projection device includes a positive-power lens optical system that forms an intermediate image of the image, a positive-power first reflection surface that reflects a light flux diverging after the formation of the intermediate image and forms the image on the projection surface, and a second reflection surface that causes the light output from the lens optical system to strike on the first reflection surface between the projection surface and the light valve. Therefore, a large screen in which chromatic aberration and distortion are reduced can be projected.

However, in the projection device of PTL 1, a distance between the first reflection surface and the second reflection surface is lengthened, which results in enlargement (high profile) of the projection device.

CITATION LIST

Patent Literature

PTL 1: Unexamined Japanese Patent Publication No. 2013-174886

SUMMARY

The present disclosure provides a compact projection optical system and a compact image projection device, in which the image distortion is reduced.

According to one aspect of the present disclosure, a projection optical system is an optical system for projecting an image light flux formed in an image display element onto a projection surface, and includes a transmission optical system and a reflection optical system. The transmission optical system is located on an emission surface side of the image display element and includes a stop and a plurality of lenses. The reflection optical system includes a positive-power first mirror and a second mirror. The first mirror reflects light output from the transmission optical system. The second mirror reflects reflected light of the first mirror toward the projection surface. Conditional Expression (1) is satisfied $$0 < TL/ft < 10 \quad (1)$$

where ft is a focal length of the transmission optical system, and

TL is a distance parallel to an optical axis of the transmission optical system from a position where the first mirror reflects a principal ray of the image light flux, which passes through a center in a long-side direction of the image display element and is projected onto the projection surface closest to a projection optical system side, to the image display element.

According to another aspect of the present disclosure, an image projection device includes the projection optical system and the image display element.

The projection optical system of the present disclosure can downsize the optical system and reduce the image distortion.

Additionally, in the image projection device of the present disclosure, the projection image in which the image distortion is reduced can be projected while the device is downsized.

DESCRIPTION OF EMBODIMENT

Hereinafter, an exemplary embodiment will be described in detail with reference to the drawings as appropriate. However, in some cases, detailed description more than necessary may be omitted. For example, in some cases, detailed description of well-known matters or repeated description of substantially the same configuration may be omitted. This is to avoid the following description from being unnecessarily redundant, and to facilitate understanding of those skilled in the art.

Note that the attached drawings and the following description are provided for those skilled in the art to fully understand the present disclosure, and are not intended to limit the subject matter as described in the appended claims.

Exemplary Embodiment

Image projection device 10 according to the present disclosure will be described below with reference to FIGS. 1 to 5.

Figure 1:
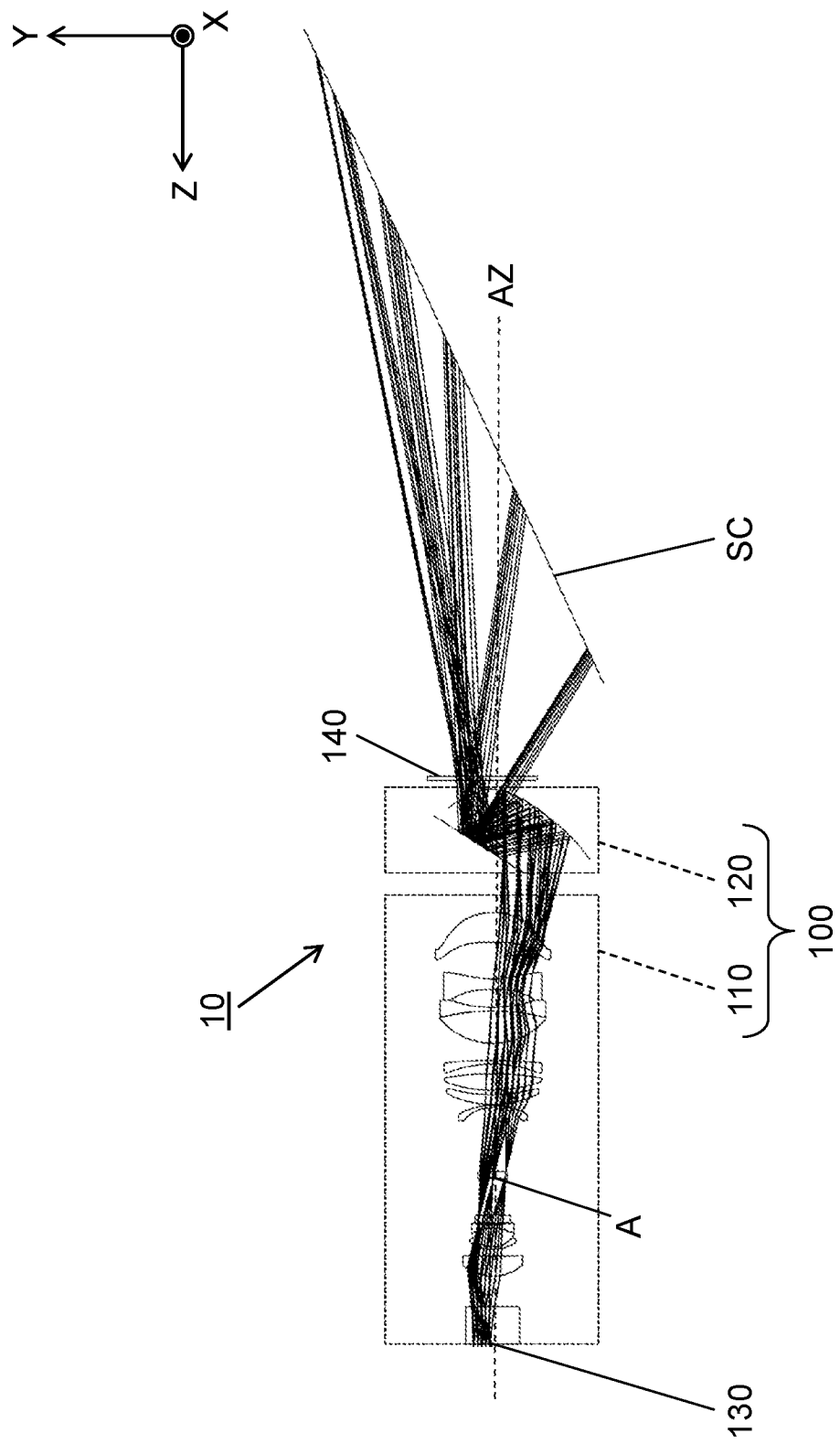
FIG. 1 is a diagram illustrating an image projection device according to the present disclosure.

FIG. 1 is a sectional diagram illustrating image projection device 10 of the present disclosure. Image projection device 10 includes projection optical system 100, image display element 130, and transmission element 140. Image projection device 10 projects an image formed by image display element 130 onto screen SC located in a non-confronting direction (oblique direction). As used herein, the non-confronting direction means the case that a direction of a normal line at a point of screen SC that a center of the projection image reaches is not matched with a direction of an optical path of the center of the image in a beam output from a final surface of projection optical system 100. In image projection device 10 of the present disclosure, a line connecting a center of stop A of transmission optical system 110 and a center of a lens located closest to a projection side is set to optical axis AZ. However, optical axis AZ may be set to an axis shared by most lens centers, or may be set while biased in a plane including an optical path (an optical path of a principal ray from the center of the image display panel to the center of a magnified image on screen SC in an optical path from image display element 130 to screen SC) of the output light with respect to the position of the image display panel.

Image projection device 10 projects the image onto a region including a point at which an extended line of optical axis AZ intersects screen SC. In the case that image projection device 10 includes a reflection surface such as a prism and a mirror in transmission optical system 110, image projection device 10 projects the image onto the region including the point at which the extended line of the optical axis of the optical system intersects screen SC after the beam is reflected by the reflection surface.

Image projection device 10 of the present disclosure projects the image onto screen SC having a curvature.

Figure 2:
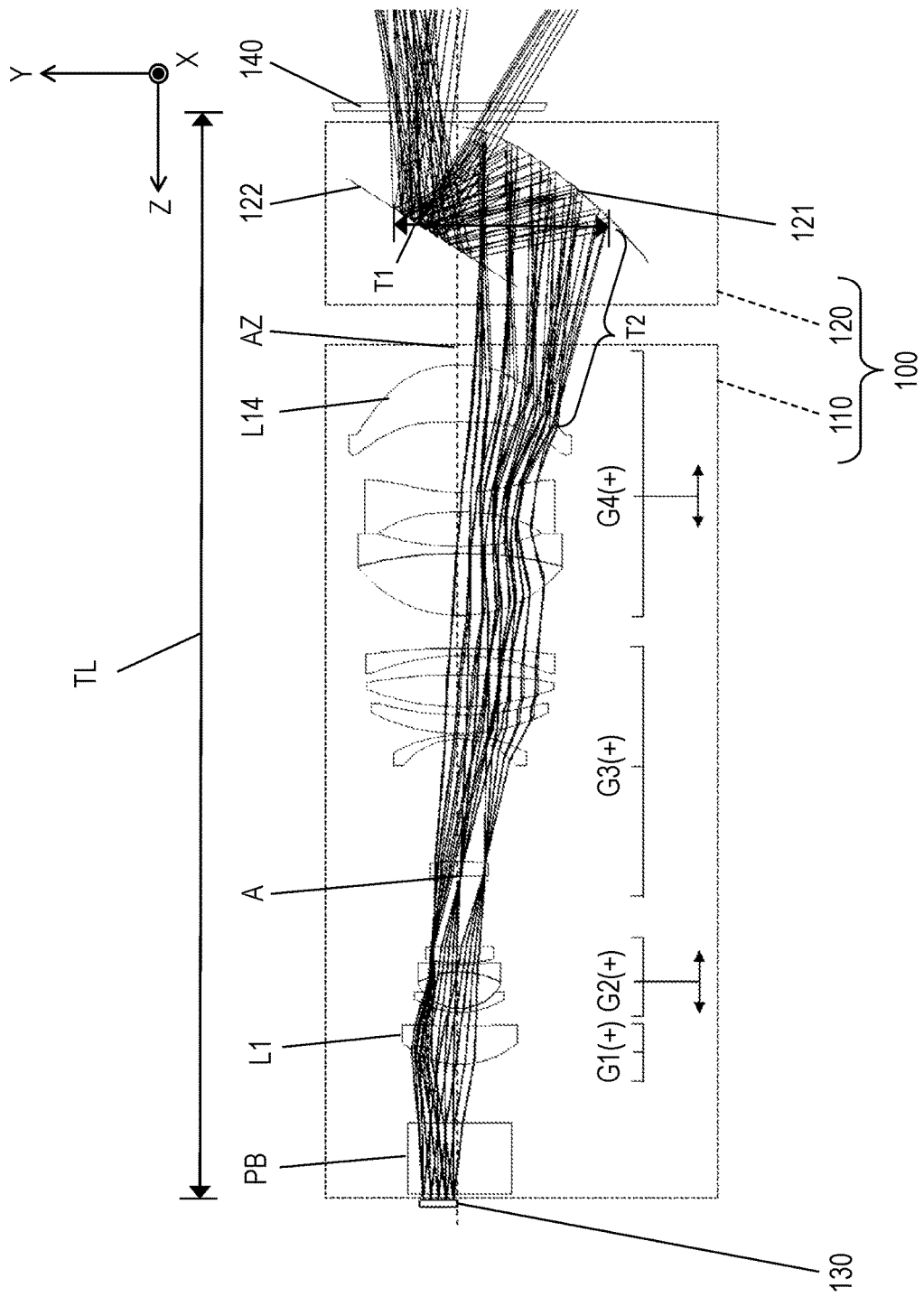
FIG. 2 is an enlarged diagram illustrating the image projection device of the present disclosure.

FIG. 2 is an enlarged diagram illustrating a section of image projection device 10 of the present disclosure. Projection optical system 100 includes transmission optical system 110 having positive power as a whole and reflection optical system 120 having positive power as a whole.

Transmission optical system 110 includes first lens group G1 having positive power, second lens group G2 having positive power, third lens group G3 having positive power, and fourth lens group G4 having positive power in the order from image display element 130 to screen SC, and includes prism PB between image display element 130 and first lens group G1.

First lens group G1 includes one biconvex lens.

Second lens group G2 includes four lens elements.

Third lens group G3 includes aperture stop A. Third lens group G3 includes five lens elements on the projection side of aperture stop A, and has positive power as a whole.

In transmission optical system 110, fourth lens group G4 located closest to the side of screen SC includes a positive-meniscus lens convex to the projection side, a biconcave lens, and a cemented lens of a negative lens and a positive lens in the order from screen SC to image display element 130. In fourth lens group G4, the positive-meniscus lens convex to the side of image display element 130 is disposed. In fourth lens group G4 closest to the projection side, the positive-meniscus-shape lens closest to the projection side and the positive-meniscus-shape cemented lens are disposed such that concave surfaces face each other.

Fourth lens group G4 includes the lens closest to the projection side, which has a shape having a high thickness deviation ratio in transmission optical system 110, on the side closest to screen SC. This enables an increase of a difference in refractive power between the center and the periphery of the transmitted light flux, so that it is effective in correcting a field curvature.

A lens adjacent to the side of image display element 130 of a lens closest to the projection side has a biconcave shape. Preferably at least one of the biconcave-shape lenses has an aspherical shape. Specifically, the lens has a shape in which a curvature decreases toward a radial direction from the center. That is, the power in a peripheral portion of the lens is smaller than that in a central portion of the lens.

In projection optical system 100, focusing is achieved using two lens groups, namely, second lens group G2 and fourth lens group G4. Fourth lens group G4 includes at least one surface having an aspherical shape, and suppresses image distortion or degradation of resolution, which is generated during the focusing. Therefore, good optical performance is satisfied even if a projection length varies.

An intermediate image is formed between transmission optical system 110 and screen SC. Therefore, since a conjugate position of the light beam output from transmission optical system 110 and first mirror 121 located on the side closest to screen SC is lengthened, an angle of the light beam incident on first mirror 121 decreases, and it is advantageous for the downsizing of the reflection optical system.

Reflection optical system 120 reflects a light flux output from transmission optical system 110, and projects the light flux onto screen SC. Reflection optical system 120 includes two mirrors, that is, first mirror 121 and second mirror 122. The reflection surface of first mirror 121 has a concave free-form surface shape, and has positive power as a whole. Reflection optical system 120 is not limited to the two mirrors, but may include at least one mirror.

Image display element 130 forms the image, which is projected onto screen SC, based on an image signal. Spatial modulation elements such as a DMD (Digital Micromirror Device) and a transmission or reflection type liquid crystal panel can be used as the image display element. Image display element 130 of the present disclosure has a rectangular shape in which an X-axis direction (a direction perpendicular to a paper plane) in FIG. 2 is a long side while a Y-axis direction is a short side.

Transmission element 140 is disposed between reflection optical system 120 and screen SC. The light flux reflected by reflection optical system 120 is transmitted through transmission element 140, and projected onto screen SC. Transmission element 140 is formed into a toroidal shape having surfaces of different curvatures in directions corresponding to the long-side direction and the short-side direction of image display element 130, and has a shape convex to the side of screen SC. That is, the curvature in the X-axis direction (the direction perpendicular to the paper plane in FIG. 2) corresponding to the long-side direction of image display element 130 in the incident surface of transmission element 140 is larger than the curvature in the Y-axis direction corresponding to the short-side direction.

Desirably, in reflection optical system 120, a free-form surface shape is provided in first mirror 121 on the side of image display element 130. When the free-form surface having the positive power is disposed in first mirror 121, a height of the light beam incident on second mirror 122 can be suppressed while the image distortion is corrected, so that it is advantageous for the downsizing.

A distance between fourteenth lens L14 disposed on the side closest to screen SC and first mirror 121 having a reflection surface of a free-form surface is longer than a distance between first mirror 121 and second mirror 122. Therefore, the distance between first mirror 121 and second mirror 122 can be shortened, and a low profile in the Y-axis direction of projection optical system 100 can be achieved.

An angle formed between optical axis AZ and a line connecting a reflection position of second mirror 122 farthest from optical axis AZ of transmission optical system 110 and a closest outermost shell of fourteenth lens L14 is smaller than an angle formed between optical axis AZ and a line connecting an outermost reflection position of first mirror 121 and a closest outermost shell of first lens L1.

A preferable condition satisfied by the projection optical system of the exemplary embodiment will be described below. A plurality of conditions are defined with respect to the projection optical systems of the exemplary embodiment, and the projection optical system satisfying the plurality of conditions is most preferable. However, the projection optical system can also obtain the corresponding effect by satisfying the individual condition.

Figure 3:
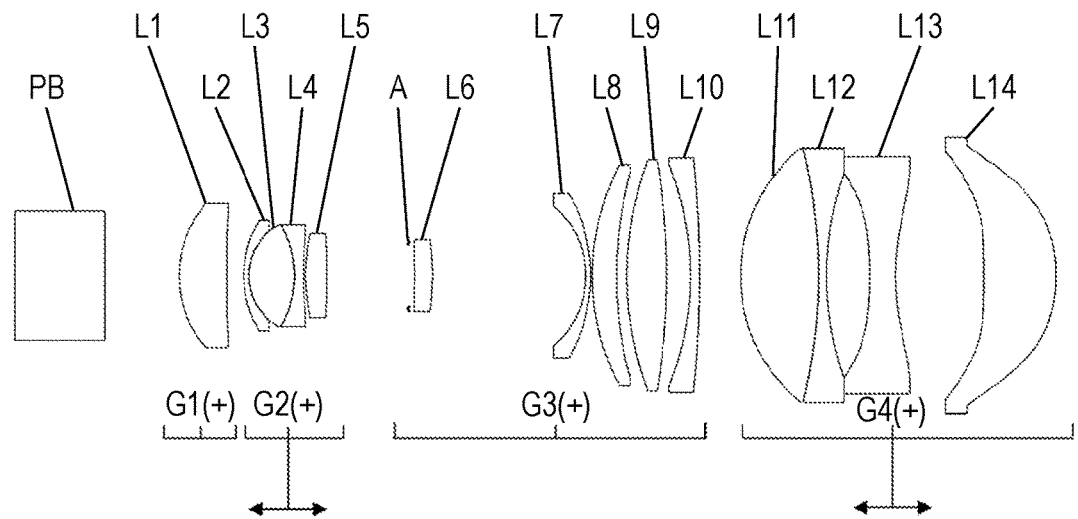
FIG. 3 is a diagram illustrating a transmission optical system of a numerical example 1.
Figure 4:
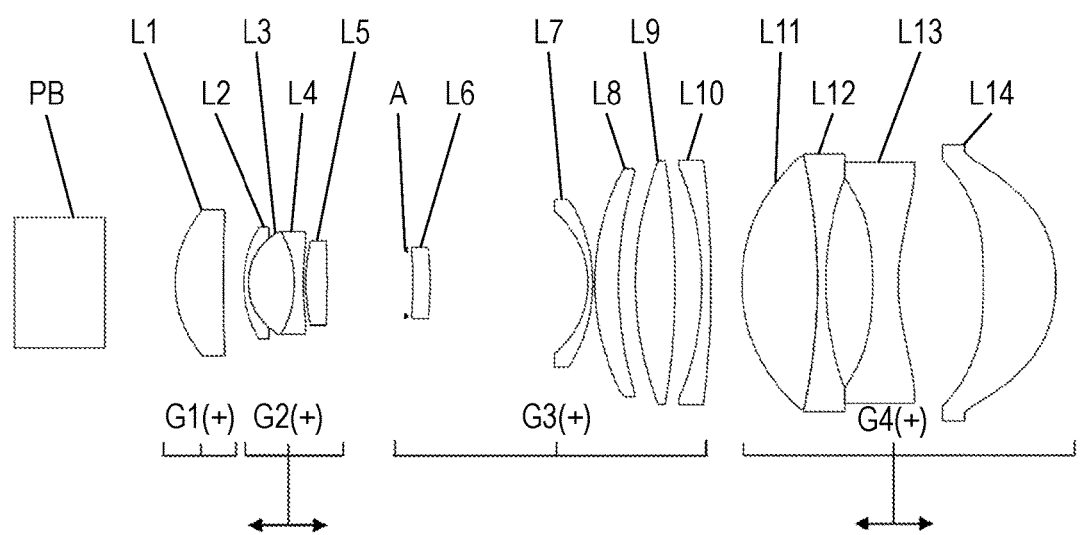
FIG. 4 is a diagram illustrating a transmission optical system of a numerical example 2.
Figure 5:
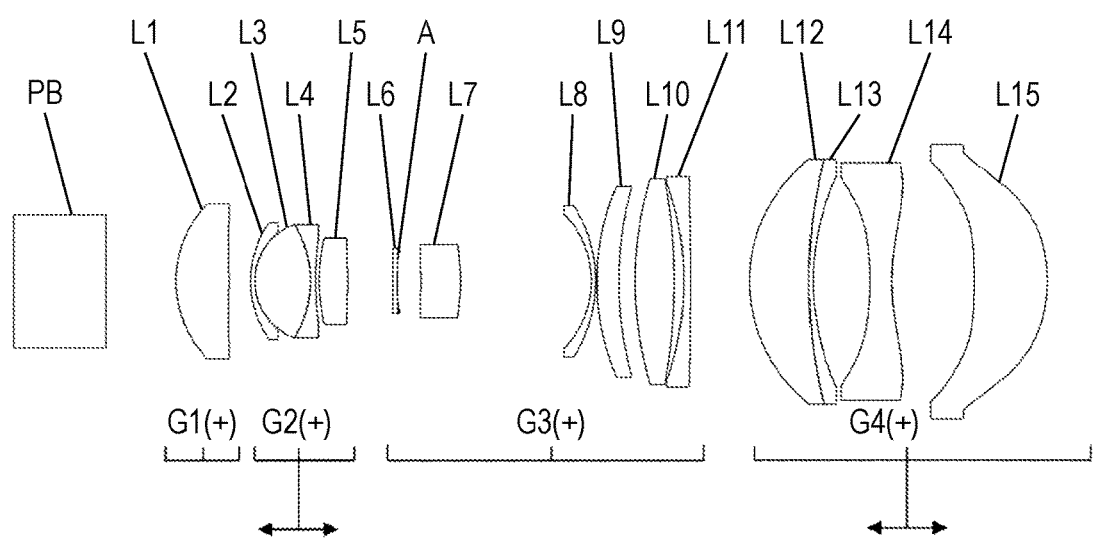
FIG. 5 is a diagram illustrating a transmission optical system of a numerical example 3.

FIG. 3 is a diagram illustrating a transmission optical system of a numerical example 1. FIG. 4 is a diagram illustrating a transmission optical system of a numerical example 2. FIG. 5 is a diagram illustrating a transmission optical system of a numerical example 3.

Preferably the projection optical system of the present disclosure satisfies Conditional Expression (1).

$$0 < TL/ft < 10 \qquad (1)$$

where
ft is a focal length of the transmission optical system, and
TL is a distance parallel to optical axis AZ from a position where the first mirror reflects a principal ray of the light flux, which passes through the center in the long-side direction of the image display element and is projected onto the projection surface closest to the projection device side, to the image display element.

Conditional Expression (1) defines suitable ranges of the focal length and a total length of transmission optical system 110. The compact projection optical system in which the image distortion is reduced can be obtained when Conditional Expression (1) is satisfied. When Conditional Expression (1) exceeds an upper limit, the total length relative to the transmission optical system is lengthened, and the transmission optical system 110 is hardly downsized. On the other hand, when Conditional Expression (1) is below a lower limit, the total length relative to the transmission optical system is excessively shortened, and generation of various errors is hardly suppressed.

The above effect can further be obtained by satisfying Conditional Expression (1)'.

$$0.05 < TL/ft < 7.5 \qquad (1)'$$

The above effect can further be obtained by satisfying Conditional Expression (1)".

$$0.07 < TL/ft < 5.0 \qquad (1)''$$

Preferably the projection optical system of the present disclosure satisfies Conditional Expression (2).

$$0.1 < ft/fmx < 60 \qquad (2)$$

where
fmx is a focal length in the X-direction (a long-side direction of the image) at the position of the first mirror that reflects the principal ray of the light flux, which passes through the center in the long-side direction of the image display element and is projected onto the projection surface closest to the projection device side.

Conditional Expression (2) defines a suitable range of the shape of the first mirror. When Conditional Expression (2) is below the lower limit, the distortion of the projection image is increased in the long-side direction of the image display element. On the other hand, when Conditional Expression (2) exceeds the upper limit, it is disadvantageous for the downsizing because the distance between the first mirror and the second mirror is excessively increased, and a coma aberration and the field curvature are generated in the transmission optical system because the power of the transmission optical system is excessively increased.

Assuming that dz/dx is a change (inclination) in sag amount in the X-axis direction of the reflection surface of first mirror 121, and that $d^2z/dx^2$ is a change in inclination in the X-axis direction of first mirror 121, focal length fmx in the X-axis direction at the position of first mirror 121 that reflects the principal ray of the light flux, which passes through the center in the long-side direction of image display element 130 and is projected onto the projection surface closest to the image projection device side, can be given by $fmx=-1/(2\times(d^2z/dx^2))$.

The above effect can further be obtained by satisfying Conditional Expression (2)'.

$$3 < ft/fmx < 50 \qquad (2)'$$

The above effect can further be obtained by satisfying Conditional Expression (2)".

$$5 < ft/fmx < 40 \qquad (2)''$$

Preferably the projection optical system of the present disclosure satisfies Conditional Expression (3).

$$0.1 < ft/fmy < 60 \qquad (3)$$

where
fmy is a focal length in the Y-direction (a short direction of the image) at the position of the first mirror that reflects the principal ray of the light flux, which passes through the center of the long side of the image display element and is projected onto the projection surface closest to the image projection device side.

Conditional Expression (3) defines a suitable range of the shape of first mirror 121. When Conditional Expression (3) is below the lower limit, the image distortion is increased in the short direction of the image display element. On the other hand, when Conditional Expression (3) exceeds the upper limit, it is disadvantageous for the downsizing because the distance between first mirror 121 and second mirror 122 is excessively increased, and the coma aberration and the field curvature are generated in the transmission optical system because the power of the transmission optical system is excessively increased.

Assuming that dz/dy is a change (inclination) in sag amount in the Y-axis direction of the surface of the first mirror, and that $d^2z/dy^2$ is a change in inclination in the Y-axis direction of the first mirror, focal length fmy in the Y-axis direction at the position of first mirror 121 that reflects the principal ray of the light flux, which passes through the center section in the long-side direction of image display element 130 and is projected onto the projection surface closest to the image projection device side, can be given by $fmy=-1/(2\times(d^2z/dy^2))$.

The above effect can further be obtained by satisfying Conditional Expression (3)'.

$$3 < ft/fmy < 50 \qquad (3)'$$

The above effect can further be obtained by satisfying Conditional Expression (3)".

$$5 < ft/fmy < 45 \qquad (3)''$$

Preferably the projection optical system of the present disclosure satisfies Conditional Expression (4).

$$0 < T2/T1 < 5 \qquad (4)$$

where
T1 is a total of a distance from a position farthest from the optical axis in the short direction of the image in the light flux reflected by the first mirror to the optical axis and a distance from a position farthest from the optical axis in the short direction of the image in the light flux reflected by the second mirror to the optical axis, and T2 is an optical path length from a lens located closest to the projection surface to the first mirror in the light beam, which passes through the center in the long-side direction of the image display element and is projected onto the projection surface closest to the image projection device side.

Conditional Expression (4) defines a suitable range of a size of a projection area caused by a distance between the transmission optical system and the reflection optical system and a size of the light flux reflected by the second mirror. When Conditional Expression (4) is below the lower limit, the distance between the lens closest to the projection side and first mirror 121 is decreased, the intermediate image having good aberration performance cannot be formed, and the field curvature cannot properly be corrected in the projection surface. On the other hand, when Conditional Expression (4) exceeds the upper limit, the distance between the lens closest to the projection side and first mirror 121 is increased, the light beam incident on reflection optical system 120 is excessively spread, and the whole size of projection optical system 100 is increased.

The above effect can further be obtained by satisfying Conditional Expression (4)'.

$$0.2<T2/T1<4 \quad (4)'$$

The above effect can further be obtained by satisfying Conditional Expression (4)".

$$0.4<T2/T1<2 \quad (4)''$$

Preferably the projection optical system of the present disclosure satisfies Conditional Expression (5).

$$0<T2/ft<5 \quad (5)$$

Conditional Expression (5) defines suitable ranges of the focal length of the transmission optical system and the distance between transmission optical system and the reflection optical system. When Conditional Expression (5) is below the lower limit, the distance between the lens closest to the projection side and the first mirror is decreased relative to the transmission optical system to hardly form the intermediate image in which the image without distortion can be projected onto the screen. On the other hand, when Conditional Expression (5) exceeds the upper limit, the distance between the lens closest to the projection side and first mirror is increased, the spread of the light beam incident on the reflection optical system is increased, and the whole size of the optical system is increased.

The above effect can further be obtained by satisfying Conditional Expression (5)'.

$$0.05<T2/ft<3 \quad (5)'$$

The above effect can further be obtained by satisfying Conditional Expression (5)".

$$0.10<T2/ft<2 \quad (5)''$$

Preferably the projection optical system of the present disclosure satisfies Conditional Expression (6).

$$0<T1/ft<3 \quad (6)$$

Conditional Expression (6) defines a suitable range of the size of the projection optical system from transmission optical system 110 and second mirror 122. When Conditional Expression (6) is below the lower limit, the size of second mirror 122 is decreased, but the projection area cannot be enlarged. On the other hand, when Conditional Expression (6) exceeds the upper limit, the size of second mirror 122 is excessively increased, and the size of projection optical system 100 is increased in the direction of the distance (height) from optical axis AZ.

The above effect can further be obtained by satisfying Conditional Expression (6)'.

$$0.05<T1/ft<3 \quad (6)'$$

The above effect can further be obtained by satisfying Conditional Expression (6)".

$$0.10<T1/ft<2 \quad (6)''$$

Preferably the projection optical system of the present disclosure satisfies Conditional Expression (7).

$$0.005<Trx(T1/ft)<1 \quad (7)$$

where

Tr is a throw ratio of the projection optical system.

Conditional Expression (7) defines suitable ranges of the throw ratio of projection optical system 100 and the size of reflection optical system 120. As used herein, the throw ratio means a value in which a projection distance of the projection optical system is divided by the size in a lengthwise direction of the image projected onto screen SC. The projection distance means a distance from an upper end of second mirror 122 to screen SC. When Conditional Expression (7) is below the lower limit, it is difficult to properly correct a distortion aberration in the projection surface. On the other hand, when Conditional Expression (7) exceeds the upper limit, an exit pupil position of transmission optical system 110 comes close to the side of reflection optical system 120, and the angle of the light beam incident on reflection optical system 120 from transmission optical system 110 is spread, so that it is not suitable for the low profile of projection optical system 100.

The above effect can further be obtained by satisfying Conditional Expression (7)'.

$$0.010<Trx(T1/ft)<0.50 \quad (7)'$$

The above effect can further be obtained by satisfying Conditional Expression (7)".

$$0.020<Trx(T1/ft)<0.30 \quad (7)''$$

Preferably the projection optical system of the present disclosure satisfies Conditional Expression (8).

$$0.1<fmmax/ft<10 \quad (8)$$

where fmmax is a maximum focal length on a surface of the first mirror.

Conditional Expression (8) defines a suitable range of a relationship between the maximum focal length in the surface of first mirror 121 and the focal length of transmission optical system 110. When Conditional Expression (8) is below the lower limit, it is difficult to favorably correct astigmatism near the center on the image projection device side in the projection surface. On the other hand, when Conditional Expression (8) exceeds the upper limit, the distortion is hardly corrected in the peripheral region of the projection surface.

At the position of first mirror 121 that reflects the light beam output from image display element 130, fmmax means the maximum focal length in $fmx=-1/(2\times(d^2z/dx^2))$ and $fmy=-1/(2\times(d^2z/dy^2))$.

The above effect can further be obtained by satisfying Conditional Expression (8)'.

$$0.130<fmmax/ft<5 \quad (8)'$$

The above effect can further be obtained by satisfying Conditional Expression (8)".

$$0.160<fmmax/ft<3 \quad (8)''$$

Preferably the projection optical system of the exemplary embodiment satisfies Conditional Expression (9).

$$0.001<fmmin/ft\leq0.1 \quad (9)$$

where fmmin is a minimum focal length at the position where each light beam is reflected by the reflection surface of the first mirror.

Conditional Expression (9) defines a suitable range of the minimum focal length on the first mirror surface in focal lengths that are obtained from the positions where the light beams output from the image display element are reflected by the first mirror reflection surface. When Conditional Expression (9) is below the lower limit, it is difficult to properly correct the astigmatism near the center on the image projection device side in the projection surface. On the other hand, when Conditional Expression (9) exceeds the upper limit, it is difficult to properly correct the distortion near the center of the projection surface.

At the position of the first mirror that reflects each light beam output from the image display element, fmmin means the minimum focal length in fmx=−1/(2×($d^2z/dx^2$)) and fmy=−1/(2×($d^2z/dy^2$)).

The above effect can further be obtained by satisfying Conditional Expression (9)'.

$$0.010 < fmmin/ft \leq 0.09 \qquad (9)'$$

The above effect can further be obtained by satisfying Conditional Expression (9)".

$$0.015 < fmmin/ft \leq 0.08 \qquad (9)''$$

Table 1 shows a corresponding value of each conditional expression, which is obtained for projection optical systems of numerical examples 1 to 3.

(Corresponding Value of Conditional Expression)

TABLE 1

|  | NUMERICAL EXAMPLE 1 | NUMERICAL EXAMPLE 2 | NUMERICAL EXAMPLE 3 |
|---|---|---|---|
| TL | 223.936 | 223.778 | 221.598 |
| fmx | 6.706 | 6.910 | 8.080 |
| fmy | 6.147 | 6.320 | 6.751 |
| T1 | 44.188 | 44.191 | 41.612 |
| T2 | 49.368 | 50.323 | 51.441 |
| fmmax | 49.942 | 50.105 | 61.698 |
| fmmin | 4.850 | 5.159 | 4.396 |
| CONDITIONAL EXPRESSION (1) | 0.922 | 1.362 | 3.422 |
| CONDITIONAL EXPRESSION (2) | 36.233 | 23.775 | 8.016 |
| CONDITIONAL EXPRESSION (3) | 39.524 | 25.995 | 9.593 |
| CONDITIONAL EXPRESSION (4) | 1.117 | 1.139 | 1.236 |
| CONDITIONAL EXPRESSION (5) | 0.203 | 0.306 | 0.794 |
| CONDITIONAL EXPRESSION (6) | 0.182 | 0.269 | 0.643 |
| CONDITIONAL EXPRESSION (7) | 0.032 | 0.047 | 0.118 |
| CONDITIONAL EXPRESSION (8) | 0.206 | 0.305 | 0.953 |
| CONDITIONAL EXPRESSION (9) | 0.020 | 0.031 | 0.068 |

Numerical examples in which the projection optical system of the exemplary embodiment is specifically implemented will be described below. In each numerical example, a unit of a length is (mm), and a unit of an angle of view is (degrees) in Tables. In each numerical example, r is a curvature radius, d is an interplanar spacing, nd is a refractive index to the d line, and vd is an Abbe number to the d line. In each numerical example, a surface denoted by an asterisk is an aspherical surface or a free-form surface, and an aspherical shape is defined by the following equation.

$$z = \frac{cr^2}{1 + \sqrt{1 - (1+k)c^2 r^2}} + Ar^4 + Br^6 + Cr^8 + Dr^{10} + Er^{12} + Fr^{14} + Gr^{16} \qquad \text{[Mathematical Formula 1]}$$

Where z is a sag amount of a surface parallel to a z-axis, r is a radial distance (=$\sqrt{(x^2+y^2)}$), c is a curvature at a surface vertex, and k is a conic constant.

Only an aspherical coefficient except for zero is written in addition to a conic constant k. In the lens group data, a lens configuration length is a distance from a first surface to a final surface, a front-side principal point position is a distance from the first surface, and a rear-side principal point position is a distance from the first surface.

A free-form surface shape is defined by the following equation using a local rectangular coordinate system (x, y, z) in which the surface vertex of the free-form surface is set to an origin.

$$z = \frac{cr^2}{1 + \sqrt{1 - (1+k)c^2 r^2}} + \sum_{j=2}^{137} C_j x^m y^n \qquad \text{[Mathematical Formula 2]}$$

$$j = \frac{(m+n)^2 + m + 3n}{2} + 2 \qquad \text{[Mathematical Formula 3]}$$

Where z is a sag amount of a surface parallel to a z-axis, r is a radial distance (=$\sqrt{(x^2+y^2)}$), c is a curvature at a surface vertex, and k is a conic constant, and Cj is a coefficient of a monomial $x^m y^n$.

In the following data, an i-degree member of x and a j-degree member of y, which are a free-form surface coefficient in a polynomial expression, are written as xiyj for convenience. For example, X2Y indicates the free-form surface coefficient of the second-degree member of x and the first-degree member of y in the polynomial expression.

Numerical Example 1

Tables 2 to 7 show specific data of the transmission optical system of the numerical example 1. In the numerical example 1, the throw ratio is 0.175. The projection magnification ranges from 111.79 to 217.09. For a size of the image display element used, a long-side direction is 9.856 mm, and a short-side direction is 6.162 mm.

Table 2 shows surface data of each optical element of example 1.

TABLE 2

| SURFACE NUMBER DMD SURFACE | r (Y-AXIS DIRECTION) | r (X-AXIS DIRECTION) | d | nd | vd | EFFECTIVE DIAMETER | ECCENTRICITY Y | Tilt α | REMARK |
|---|---|---|---|---|---|---|---|---|---|
| 1 | INFINITY | INFINITY | 1.000 |  |  |  | −1.230 |  |  |
| 2 | INFINITY | INFINITY | 15.000 | 1.51680 | 64.20 |  |  |  |  |
| 3 | INFINITY | INFINITY | 12.389 |  |  |  |  |  |  |
| 4* | 18.143 | 18.143 | 8.000 | 1.59349 | 67.00 |  |  |  |  |
| 5* | 1071.887 | 1071.887 | VARIABLE |  |  |  |  |  |  |

TABLE 2-continued

| SURFACE NUMBER DMD SURFACE | r (Y-AXIS DIRECTION) | r (X-AXIS DIRECTION) | d | nd | vd | EFFECTIVE DIAMETER | ECCENTRICITY Y | Tilt α | REMARK |
|---|---|---|---|---|---|---|---|---|---|
| 6 | 16.711 | 16.711 | 0.900 | 1.95375 | 32.32 | | | | |
| 7 | 9.455 | 9.455 | 7.600 | 1.49700 | 81.61 | | | | |
| 8 | −16.609 | −16.609 | 1.500 | 1.90366 | 31.31 | | | | |
| 9 | 54.556 | 54.556 | 0.419 | | | | | | |
| 10 | 30.215 | 30.215 | 3.500 | 1.84666 | 23.78 | | | | |
| 11 | −134.074 | −134.074 | VARIABLE | | | | | | |
| 12 (STOP) | INFINITY | INFINITY | 1.000 | | | 9.964 | | | |
| 13 | −141.786 | −141.786 | 3.000 | 1.72825 | 28.32 | | | | |
| 14 | −44.735 | −44.735 | 25.696 | | | | | | |
| 15 | −14.911 | −14.911 | 0.800 | 1.71300 | 53.94 | | | | |
| 16 | −26.716 | −26.716 | 0.300 | | | | | | |
| 17 | 38.576 | 38.576 | 4.000 | 1.70154 | 41.15 | | | | |
| 18 | 61.536 | 61.536 | 1.788 | | | | | | |
| 19 | 53.406 | 53.406 | 6.600 | 1.75211 | 25.05 | | | | |
| 20 | −112.460 | −112.460 | 3.966 | | | | | | |
| 21 | −47.828 | −47.828 | 1.500 | 1.59349 | 67.00 | | | | |
| 22 | −174.726 | −174.726 | VARIABLE | | | | | | |
| 23 | 26.615 | 26.615 | 13.000 | 1.72916 | 54.67 | | | | |
| 24 | −84.826 | −84.826 | 1.500 | 1.92286 | 20.88 | | | | |
| 25 | 50.147 | 50.147 | 7.220 | | | | | | |
| 26* | −56.182 | −56.182 | 4.200 | 1.68893 | 31.07 | | | | |
| 27* | 32.777 | 32.777 | 14.813 | | | | | | |
| 28* | −341.331 | −341.331 | 12.000 | 1.53775 | 74.70 | | | | |
| 29* | −24.581 | −24.581 | VARIABLE | | | | | | |
| 30* | −50.193 | −50.193 | 0.000 | | | | −46.500 | −51.300 | MIRROR |
| 31 | | | −41.380 | | | | | | |
| 32 | | | 6.560 | | | | 81.106 | 18.100 | MIRROR |
| 33 | INFINITY | −113.000 | 2.000 | 1.51680 | 64.20 | | | 33.200 | ONLY SURFACE IS ECCENTRIC |
| 34 | INFINITY | −115.000 | VARIABLE | | | | | 33.200 | ONLY SURFACE IS ECCENTRIC |
| 35 | | | | | | | | −32.800 | SCREEN |

Table 3 shows aspherical data.

TABLE 3

| COEFFICIENT | FOURTH SURFACE | FIFTH SURFACE | TWENTY-SIXTH SURFACE | TWENTY-SEVENTH SURFACE | TWENTY-EIGHTH SURFACE | TWENTY-NINTH SURFACE |
|---|---|---|---|---|---|---|
| k | −0.04170 | 0.00000 | 3.27897 | 0.47070 | 99.96900 | −0.09921 |
| A | 2.3514E−05 | 2.4582E−05 | 2.6382E−06 | −3.4014E−05 | −5.0467E−05 | −2.2030E−05 |
| B | −7.7306E−08 | 8.2842E−08 | −2.7334E−07 | 3.2338E−08 | −1.9327E−07 | −6.4774E−08 |
| C | −4.9027E−10 | −2.8535E−09 | 9.8427E−10 | −5.9025E−11 | 1.4604E−09 | 1.9181E−10 |
| D | −7.9495E−13 | 6.7999E−12 | −1.0277E−12 | −1.1384E−13 | −2.5041E−12 | 7.8913E−14 |
| E | 1.8289E−14 | 1.2796E−13 | −7.9603E−17 | 2.7126E−16 | 2.4112E−17 | −3.7685E−16 |
| F | 3.4998E−17 | −9.4584E−16 | 4.8660E−19 | 5.5053E−19 | 5.1603E−19 | −1.2712E−19 |
| G | −5.4231E−19 | 1.6552E−18 | −4.1088E−22 | −9.6601E−22 | 3.4709E−21 | 9.1484E−22 |

Table 4 shows free-form surface data.

TABLE 4

| COEFFICIENT | DEGREE | FREE CURVED SURFACE MIRROR |
|---|---|---|
| k | 0 | −0.403199863 |
| C5 | X2 | −1.31862E−03 |
| C7 | Y2 | 1.88251E−02 |
| C9 | X2Y | 1.84263E−04 |
| C11 | Y3 | −6.09179E−04 |
| C12 | X4 | 4.19506E−06 |
| C14 | X2Y2 | −9.79777E−06 |
| C16 | Y4 | 1.49872E−05 |
| C18 | X4Y | −7.94402E−07 |

TABLE 4-continued

| COEFFICIENT | DEGREE | FREE CURVED SURFACE MIRROR |
|---|---|---|
| C20 | X2Y3 | 5.26153E−08 |
| C22 | Y5 | −1.50240E−07 |
| C23 | X6 | −2.42504E−09 |
| C25 | X4Y2 | 6.80124E−08 |
| C27 | X2Y4 | 3.82936E−09 |
| C29 | Y6 | −9.09269E−11 |
| C31 | X6Y | −5.59445E−10 |
| C33 | X4Y3 | −2.82875E−09 |
| C35 | X2Y5 | 1.71428E−10 |
| C37 | Y7 | 9.87541E−12 |
| C38 | X8 | 1.30229E−11 |

TABLE 4-continued

| COEFFICIENT | DEGREE | FREE CURVED SURFACE MIRROR |
|---|---|---|
| C40 | X6Y2 | 4.87074E−11 |
| C42 | X4Y4 | 4.24071E−11 |
| C44 | X2Y6 | −1.47586E−11 |
| C46 | Y8 | 1.72149E−14 |
| C48 | X8Y | 5.54630E−13 |
| C50 | X6Y3 | −1.56941E−12 |
| C52 | X4Y5 | 4.76512E−13 |
| C54 | X2Y7 | 2.67145E−13 |
| C56 | Y9 | 1.02923E−15 |
| C57 | X10 | −5.04121E−14 |
| C59 | X8Y2 | 1.94831E−14 |
| C61 | X6Y4 | 4.80831E−15 |
| C63 | X4Y6 | −9.97033E−15 |
| C65 | X2Y8 | −7.04488E−16 |
| C67 | Y10 | 2.75018E−17 |
| C69 | X10Y1 | −1.81743E−15 |
| C71 | X8Y3 | −2.55302E−15 |
| C73 | X6Y5 | 1.35471E−15 |
| C75 | X4Y7 | −4.91298E−16 |
| C77 | X2Y9 | 2.70828E−17 |
| C79 | Y11 | −7.29563E−19 |
| C80 | X12 | 1.58722E−16 |
| C82 | X10Y2 | 8.81432E−17 |
| C84 | X8Y4 | 8.60305E−18 |
| C86 | X6Y6 | −2.24810E−17 |
| C88 | X4Y8 | 7.08458E−18 |
| C90 | X2Y10 | −1.18694E−18 |
| C92 | Y12 | −1.75144E−20 |
| C94 | X12Y1 | −6.84567E−18 |
| C96 | X10Y3 | 4.10754E−18 |
| C98 | X8Y5 | 6.51245E−19 |
| C100 | X6Y7 | −4.86385E−19 |
| C102 | X4Y9 | 2.79283E−19 |
| C104 | X2Y11 | −1.51013E−20 |
| C106 | Y13 | 1.45912E−22 |
| C107 | X14 | −4.90231E−20 |
| C109 | X12Y2 | 8.13046E−20 |
| C111 | X10Y4 | −1.60892E−19 |
| C113 | X8Y6 | 1.24813E−20 |
| C115 | X6Y8 | 1.33666E−20 |
| C117 | X4Y10 | −7.13494E−21 |
| C119 | X2Y12 | 7.56101E−22 |
| C121 | Y14 | 6.63380E−24 |
| C123 | X14Y1 | 1.36470E−21 |
| C125 | X12Y3 | −3.78806E−22 |
| C127 | X10Y5 | 1.34835E−21 |
| C129 | X8Y7 | −2.80183E−22 |
| C131 | X6Y9 | −7.44194E−23 |
| C133 | X4Y11 | 4.52702E−23 |
| C135 | X2Y13 | −6.08254E−24 |
| C137 | Y15 | −7.07601E−26 |

Table 5 shows zoom data.

TABLE 5

| PROJECTION SIZE (INCH) | 50" | 80" | 100" |
|---|---|---|---|
| d5 | 2.953 | 2.826 | 2.787 |
| d11 | 13.511 | 13.638 | 13.677 |
| d22 | 6.163 | 6.850 | 7.050 |
| d29 | 10.987 | 10.300 | 10.100 |
| d34 | 239.141 | 377.779 | 457.905 |

Table 6 shows single-lens data.

TABLE 6

| LENS NUMBER | FOCAL DISTANCE |
|---|---|
| L1 | 31.01 |
| L2, L3, L4 | −35.70 |
| L5 | 29.41 |
| L6 | 88.59 |
| L7 | −48.70 |
| L8 | 137.50 |
| L9 | 48.98 |
| L10 | −111.45 |
| L11, L12 | 88.20 |
| L13 | −29.48 |
| L14 | 48.61 |

Table 7 shows lens group data.

TABLE 7

| LENS GROUP | FOCAL DISTANCE |
|---|---|
| G1 | 31.01 |
| G2 | 225.44 |
| G3 | 94.87 |
| G4 | 124.47 |

Numerical Example 2

Tables 8 to 13 show specific data of the transmission optical system of the numerical example 2. In the numerical example 2, the throw ratio is 0.176. The projection magnification ranges from 113.23 to 217.59. For a size of the image display element used, a long-side direction is 9.856 mm, and a short-side direction is 6.162 mm.

Table 8 shows the surface data of each optical element of example 2.

TABLE 8

| SURFACE NUMBER DMD SURFACE | r (Y-AXIS DIRECTION) | r (X-AXIS DIRECTION) | d | nd | vd | EFFECTIVE DIAMETER | ECCENTRICITY Y | Tilt α | REMARK |
|---|---|---|---|---|---|---|---|---|---|
| 1 | INFINITY | INFINITY | 1.000 | | | | −1.233 | | |
| 2 | INFINITY | INFINITY | 15.000 | 1.51680 | 64.20 | | | | |
| 3 | INFINITY | INFINITY | 11.706 | | | | | | |
| 4* | 18.222 | 18.222 | 8.000 | 1.59349 | 67.00 | | | | |
| 5* | 52516.060 | 52516.060 | VARIABLE | | | | | | |
| 6 | 16.584 | 16.584 | 0.900 | 1.95375 | 32.32 | | | | |
| 7 | 9.520 | 9.520 | 7.600 | 1.49700 | 81.61 | | | | |
| 8 | −16.480 | −16.480 | 1.500 | 1.90366 | 31.31 | | | | |
| 9 | 55.608 | 55.608 | 0.400 | | | | | | |
| 10 | 30.315 | 30.315 | 3.500 | 1.84666 | 23.78 | | | | |
| 11 | −133.595 | −133.595 | VARIABLE | | | | | | |
| 12 (STOP) | INFINITY | INFINITY | 1.000 | | | 9.778 | | | |
| 13 | −133.400 | −133.400 | 3.000 | 1.72825 | 28.32 | | | | |
| 14 | −45.067 | −45.067 | 26.215 | | | | | | |

TABLE 8-continued

| SURFACE NUMBER DMD SURFACE | r (Y-AXIS DIRECTION) | r (X-AXIS DIRECTION) | d | nd | vd | EFFECTIVE DIAMETER | ECCENTRICITY Y | Tilt α | REMARK |
|---|---|---|---|---|---|---|---|---|---|
| 15 | −14.844 | −14.844 | 0.800 | 1.71300 | 53.94 | | | | |
| 16 | −25.738 | −25.738 | 0.300 | | | | | | |
| 17 | 38.553 | 38.553 | 4.000 | 1.70154 | 41.15 | | | | |
| 18 | 62.660 | 62.660 | 2.749 | | | | | | |
| 19 | 53.548 | 53.548 | 6.600 | 1.75211 | 25.05 | | | | |
| 20 | −122.013 | −122.013 | 4.464 | | | | | | |
| 21 | −48.554 | −48.554 | 1.500 | 1.59349 | 67.00 | | | | |
| 22 | −159.561 | −159.561 | VARIABLE | | | | | | |
| 23 | 26.757 | 26.757 | 12.500 | 1.72916 | 54.67 | | | | |
| 24 | −96.740 | −96.740 | 1.500 | 1.92286 | 20.88 | | | | |
| 25 | 48.336 | 48.336 | 7.744 | | | | | | |
| 26* | −53.360 | −53.360 | 4.300 | 1.68893 | 31.07 | | | | |
| 27* | 32.603 | 32.603 | 14.048 | | | | | | |
| 28* | −285.848 | −285.848 | 12.000 | 1.53775 | 74.70 | | | | |
| 29* | −24.449 | −24.449 | VARIABLE | | | | | | |
| 30* | −52.242 | −52.242 | 0.000 | | | | −46.490 | −51.253 | MIRROR |
| 31 | | | −41.493 | | | | | | |
| 32 | | | 7.584 | | | | 81.106 | 18.066 | MIRROR |
| 33 | INFINITY | −113.000 | 2.000 | 1.51680 | 64.20 | | | 33.188 | ONLY SURFACE IS ECCENTRIC |
| 34 | INFINITY | −115.000 | VARIABLE | | | | | 33.188 | ONLY SURFACE IS ECCENTRIC |
| 35 | | | | | | | | −32.813 | SCREEN |

Table 9 shows the aspherical data.

TABLE 9

| COEFFICIENT | FOURTH SURFACE | FIFTH SURFACE | TWENTY-SIXTH SURFACE | TWENTY-SEVENTH SURFACE | TWENTY-EIGHTH SURFACE | TWENTY-NINTH SURFACE |
|---|---|---|---|---|---|---|
| k | −0.06294 | 100.00000 | 2.39088 | 0.39346 | 99.88494 | −0.11200 |
| A | 2.0455E−05 | 2.3752E−05 | 2.9453E−06 | −3.4067E−05 | −5.2625E−05 | −2.3049E−05 |
| B | −4.3767E−08 | 8.4328E−08 | −2.6673E−07 | 3.5932E−08 | −1.8860E−07 | −6.2933E−08 |
| C | −7.2302E−10 | −2.6662E−09 | 9.8397E−10 | −5.0860E−11 | 1.4665E−09 | 1.8286E−10 |
| D | −8.0267E−13 | 6.1795E−12 | −1.0393E−12 | −1.2835E−13 | −2.5209E−12 | 7.6061E−14 |
| E | 2.5214E−14 | 1.2112E−13 | −1.6879E−16 | 2.3411E−16 | −3.6438E−17 | −3.6909E−16 |
| F | 1.0676E−16 | −7.9574E−16 | 1.9109E−19 | 5.7624E−19 | 4.4936E−19 | −1.1612E−19 |
| G | −1.1776E−18 | 6.3427E−19 | 6.6748E−22 | −1.0043E−21 | 3.7229E−21 | 9.2240E−22 |

Table 10 shows the free-form surface data.

TABLE 10

| COEFFICIENT | DEGREE | FREE CURVED SURFACE MIRROR |
|---|---|---|
| k | 0 | −0.339472892 |
| C5 | X2 | −1.68479E−03 |
| C7 | Y2 | 1.81782E−02 |
| C9 | X2Y | 1.88023E−04 |
| C11 | Y3 | −5.97931E−04 |
| C12 | X4 | 3.28817E−06 |
| C14 | X2Y2 | −1.03273E−05 |
| C16 | Y4 | 1.49436E−05 |
| C18 | X4Y | −5.81747E−07 |
| C20 | X2Y3 | 1.24404E−07 |
| C22 | Y5 | −1.61047E−07 |
| C23 | X6 | −5.44989E−09 |
| C25 | X4Y2 | 3.97207E−08 |
| C27 | X2Y4 | −1.64885E−09 |
| C29 | Y6 | 5.43000E−11 |
| C31 | X6Y | 6.91988E−10 |
| C33 | X4Y3 | −1.35166E−09 |
| C35 | X2Y5 | 3.16738E−10 |

TABLE 10-continued

| COEFFICIENT | DEGREE | FREE CURVED SURFACE MIRROR |
|---|---|---|
| C37 | Y7 | 1.46824E−11 |
| C38 | X8 | 4.41749E−13 |
| C40 | X6Y2 | −3.56100E−11 |
| C42 | X4Y4 | 2.35506E−11 |
| C44 | X2Y6 | −1.49915E−11 |
| C46 | Y8 | −6.48453E−15 |
| C48 | X8Y | 1.26815E−14 |
| C50 | X6Y3 | 8.35959E−13 |
| C52 | X4Y5 | −1.99455E−13 |
| C54 | X2Y7 | 2.68628E−13 |
| C56 | Y9 | −1.23732E−15 |
| C57 | X10 | −2.21240E−16 |
| C59 | X8Y2 | 3.98117E−17 |
| C61 | X6Y4 | −7.74138E−15 |
| C63 | X4Y6 | 9.51640E−16 |
| C65 | X2Y8 | −1.82634E−15 |
| C67 | Y10 | 4.47930E−18 |
| C69 | X10Y1 | −3.97067E−17 |
| C71 | X8Y3 | 1.41368E−17 |
| C73 | X6Y5 | −1.18401E−17 |

TABLE 10-continued

| COEFFICIENT | DEGREE | FREE CURVED SURFACE MIRROR |
|---|---|---|
| C75 | X4Y7 | 2.38903E−18 |
| C77 | X2Y9 | −6.51385E−20 |
| C79 | Y11 | 1.03868E−20 |
| C80 | X12 | 9.33180E−19 |
| C82 | X10Y2 | −4.17633E−19 |
| C84 | X8Y4 | 4.11424E−20 |
| C86 | X6Y6 | −4.55254E−20 |
| C88 | X4Y8 | −6.65658E−20 |
| C90 | X2Y10 | 8.37395E−21 |
| C92 | Y12 | 2.32703E−22 |
| C94 | X12Y1 | −6.52974E−20 |
| C96 | X10Y3 | 1.45458E−20 |
| C98 | X8Y5 | −3.68586E−21 |
| C100 | X6Y7 | 7.34041E−21 |
| C102 | X4Y9 | −2.36112E−21 |
| C104 | X2Y11 | 2.96099E−22 |
| C106 | Y13 | 2.62847E−24 |
| C107 | X14 | 5.01918E−22 |
| C109 | X12Y2 | 1.26536E−21 |
| C111 | X10Y4 | −2.76492E−22 |
| C113 | X8Y6 | 1.86915E−23 |
| C115 | X6Y8 | 8.62424E−23 |
| C117 | X4Y10 | −2.28183E−23 |
| C119 | X2Y12 | 2.00930E−24 |
| C121 | Y14 | 3.24178E−26 |
| C123 | X14Y1 | −5.18199E−23 |
| C125 | X12Y3 | 1.02938E−22 |
| C127 | X10Y5 | −5.78942E−23 |
| C129 | X8Y7 | 1.54359E−23 |
| C131 | X6Y9 | −4.52945E−24 |
| C133 | X4Y11 | 1.08800E−24 |
| C135 | X2Y13 | −1.45344E−25 |
| C137 | Y15 | −9.03177E−28 |

Table 11 shows the zoom data.

TABLE 11

| PROJECTION SIZE (INCH) | 50" | 80" | 100" |
|---|---|---|---|
| d5 | 3.494 | 3.363 | 3.317 |
| d11 | 12.988 | 13.119 | 13.165 |
| d22 | 4.344 | 5.096 | 5.312 |
| d29 | 12.286 | 11.535 | 11.319 |
| d34 | 239.355 | 377.930 | 457.926 |

Table 12 shows the single-lens data.

TABLE 12

| LENS NUMBER | FOCAL DISTANCE |
|---|---|
| L1 | 30.71 |
| L2, L3, L4 | −37.11 |
| L5 | 29.47 |
| L6 | 92.14 |
| L7 | −50.74 |
| L8 | 133.70 |
| L9 | 50.29 |
| L10 | −118.19 |
| L11, L12 | 93.51 |
| L13 | −28.79 |
| 14 | 48.93 |

Table 13 shows the lens group data.

TABLE 13

| LENS GROUP | FOCAL DISTANCE |
|---|---|
| G1 | 30.71 |
| G2 | 191.20 |
| G3 | 92.40 |
| G4 | 139.70 |

Numerical Example 3

Tables 14 to 19 show specific data of the transmission optical system of the numerical example 3. In the numerical example 1, the throw ratio is 0.184. The projection magnification ranges from 112.85 to 217.12. For a size of the image display element used, a long-side direction is 9.856 mm, and a short-side direction is 6.162 mm.

Table 14 shows the surface data of each optical element of example 3.

TABLE 14

| SURFACE NUMBER DMD SURFACE | r (Y-AXIS DIRECTION) | r (X-AXIS DIRECTION) | d | nd | vd | EFFECTIVE DIAMETER | ECCENTRICITY Y | Tilt α | REMARK |
|---|---|---|---|---|---|---|---|---|---|
| 1 | INFINITY | INFINITY | 1.000 | | | | −1.237 | | |
| 2 | INFINITY | INFINITY | 15.000 | 1.51680 | 64.20 | | | | |
| 3 | INFINITY | INFINITY | 11.500 | | | | | | |
| 4* | 18.654 | 18.654 | 8.710 | 1.59349 | 67.00 | | | | |
| 5* | −234.636 | −234.636 | VARIABLE | | | | | | |
| 6 | 16.558 | 16.558 | 0.700 | 1.95375 | 32.32 | | | | |
| 7 | 9.942 | 9.942 | 9.107 | 1.49700 | 81.61 | | | | |
| 8 | −17.602 | −17.602 | 0.845 | 1.90366 | 31.31 | | | | |
| 9 | 52.918 | 52.918 | 0.593 | | | | | | |
| 10 | 30.721 | 30.721 | 4.705 | 1.84666 | 23.78 | | | | |
| 11 | −122.453 | −122.453 | VARIABLE | | | | | | |
| 12 | −1041.154 | −1041.154 | 0.700 | | | | | | |
| 13 | 117.875 | 117.875 | 0.187 | 1.69895 | 30.05 | | | | |
| 14 (STOP) | INFINITY | INFINITY | 3.694 | | | 9.043 | | | |
| 15 | −142.236 | −142.236 | 6.429 | 1.69895 | 30.05 | | | | |
| 16 | −40.484 | −40.484 | 21.565 | | | | | | |
| 17 | −15.927 | −15.927 | 0.707 | 1.72000 | 43.90 | | | | |
| 18 | −23.327 | −23.327 | 0.208 | | | | | | |

TABLE 14-continued

| SURFACE NUMBER DMD SURFACE | r (Y-AXIS DIRECTION) | r (X-AXIS DIRECTION) | d | nd | vd | EFFECTIVE DIAMETER | ECCENTRICITY Y | Tilt α | REMARK |
|---|---|---|---|---|---|---|---|---|---|
| 19 | 39.863 | 39.863 | 3.553 | 1.76182 | 26.61 | | | | |
| 20 | 58.936 | 58.936 | 2.697 | | | | | | |
| 21 | 60.058 | 60.058 | 6.434 | 1.68893 | 31.16 | | | | |
| 22 | −93.684 | −93.684 | 1.517 | | | | | | |
| 23 | −50.020 | −50.020 | 1.136 | 1.49700 | 81.61 | | | | |
| 24 | −515.019 | −515.019 | VARIABLE | | | | | | |
| 25 | 25.789 | 25.789 | 9.764 | 1.71300 | 53.94 | | | | |
| 26 | 84.288 | 84.288 | 0.700 | 1.94595 | 17.98 | | | | |
| 27 | 41.071 | 41.071 | 9.471 | | | | | | |
| 28* | −47.124 | −47.124 | 3.491 | 1.72825 | 28.32 | | | | |
| 29* | 33.877 | 33.877 | 13.516 | | | | | | |
| 30* | −139.739 | −139.739 | 11.992 | 1.53775 | 74.70 | | | | |
| 31* | −25.313 | −25.313 | VARIABLE | | | | | | |
| 32* | −53.831 | −53.831 | 0.000 | | | | −47.487 | −51.967 | MIRROR |
| 33 | | | −29.472 | | | | | | |
| 34 | | | 29.130 | | | | 45.435 | 21.817 | MIRROR |
| 35 | INFINITY | −110.000 | 2.000 | 1.51680 | 64.17 | | | 30.150 | ONLY SURFACE IS ECCENTRIC |
| 36 | INFINITY | −112.000 | VARIABLE | | | | | 30.150 | ONLY SURFACE IS ECCENTRIC |
| 37 | | | | | | | | −29.849 | SCREEN |

Table 15 shows the aspherical data.

TABLE 15

| COEFFICIENT | FOURTH SURFACE | FIFTH SURFACE | TWENTY-EIGHTH SURFACE | TWENTY-NINTH SURFACE | THIRTIETH SURFACE | THIRTY-FIRST SURFACE |
|---|---|---|---|---|---|---|
| k | −0.11911 | −100.00000 | 1.49000 | 0.03343 | −100.00000 | −0.06990 |
| A | 1.7586E−05 | 2.5727E−05 | 5.5464E−06 | −4.0062E−05 | −5.9463E−05 | −1.9718E−05 |
| B | −6.1241E−08 | 3.7358E−08 | −2.6587E−07 | 3.4773E−08 | −1.8135E−07 | −6.3309E−08 |
| C | −3.7409E−10 | −1.5158E−09 | 9.6259E−10 | −3.3119E−11 | 1.4903E−09 | 1.4495E−10 |
| D | 8.4280E−13 | 4.1544E−12 | −1.0211E−12 | −1.1247E−13 | −2.5434E−12 | 1.5352E−13 |
| E | 1.8394E−14 | 7.3391E−14 | −5.0937E−17 | 2.1517E−16 | −9.2107E−17 | −2.0710E−16 |
| F | −8.2679E−17 | −5.3758E−16 | 7.6863E−20 | 3.6714E−19 | 4.1431E−19 | −1.2043E−19 |
| G | 4.8557E−20 | 9.7649E−19 | −1.6635E−22 | −1.0047E−21 | 3.6827E−21 | 3.1127E−22 |

Table 16 shows the free-form surface data.

TABLE 16

| COEFFICIENT | DEGREE | FREE CURVED SURFACE MIRROR |
|---|---|---|
| k | 0 | −0.323338401 |
| C5 | X2 | −2.28863E−03 |
| C7 | Y2 | 1.80948E−02 |
| C9 | X2Y | 3.37331E−04 |
| C11 | Y3 | −6.50665E−04 |
| C12 | X4 | 1.38434E−06 |
| C14 | X2Y2 | −2.61702E−05 |
| C16 | Y4 | 1.73183E−05 |
| C18 | X4Y | −2.36915E−07 |
| C20 | X2Y3 | 9.73376E−07 |
| C22 | Y5 | −2.04905E−07 |
| C23 | X6 | −4.62630E−09 |
| C25 | X4Y2 | 1.66324E−08 |
| C27 | X2Y4 | −2.34240E−08 |
| C29 | Y6 | 3.46805E−11 |
| C31 | X6Y | 5.21006E−10 |
| C33 | X4Y3 | −6.80128E−10 |
| C35 | X2Y5 | 4.69642E−10 |
| C37 | Y7 | 2.32373E−11 |
| C38 | X8 | 2.35093E−12 |

TABLE 16-continued

| COEFFICIENT | DEGREE | FREE CURVED SURFACE MIRROR |
|---|---|---|
| C40 | X6Y2 | −2.33734E−11 |
| C42 | X4Y4 | 1.55433E−11 |
| C44 | X2Y6 | −1.02562E−11 |
| C46 | Y8 | −8.26876E−15 |
| C48 | X8Y | −1.64238E−13 |
| C50 | X6Y3 | 5.33848E−13 |
| C52 | X4Y5 | −1.82709E−13 |
| C54 | X2Y7 | 1.60166E−13 |
| C56 | Y9 | −3.31161E−15 |
| C57 | X10 | 4.93041E−16 |
| C59 | X8Y2 | 1.95319E−15 |
| C61 | X6Y4 | −4.98663E−15 |
| C63 | X4Y6 | 9.04991E−16 |
| C65 | X2Y8 | −1.10711E−15 |
| C67 | Y10 | 2.16733E−17 |
| C69 | X10Y1 | 0.00000E+00 |
| C71 | X8Y3 | 0.00000E+00 |
| C73 | X6Y5 | 0.00000E+00 |
| C75 | X4Y7 | 0.00000E+00 |
| C77 | X2Y9 | 0.00000E+00 |
| C79 | Y11 | 0.00000E+00 |
| C80 | X12 | 0.00000E+00 |

TABLE 16-continued

| COEFFICIENT | DEGREE | FREE CURVED SURFACE MIRROR |
|---|---|---|
| C82 | X10Y2 | 0.00000E+00 |
| C84 | X8Y4 | 0.00000E+00 |
| C86 | X6Y6 | 0.00000E+00 |
| C88 | X4Y8 | 0.00000E+00 |
| C90 | X2Y10 | 0.00000E+00 |
| C92 | Y12 | 0.00000E+00 |
| C94 | X12Y1 | 0.00000E+00 |
| C96 | X10Y3 | 0.00000E+00 |
| C98 | X8Y5 | 0.00000E+00 |
| C100 | X6Y7 | 0.00000E+00 |
| C102 | X4Y9 | 0.00000E+00 |
| C104 | X2Y11 | 0.00000E+00 |
| C106 | Y13 | 0.00000E+00 |
| C107 | X14 | 0.00000E+00 |
| C109 | X12Y2 | 0.00000E+00 |
| C111 | X10Y4 | 0.00000E+00 |
| C113 | X8Y6 | 0.00000E+00 |
| C115 | X6Y8 | 0.00000E+00 |
| C117 | X4Y10 | 0.00000E+00 |
| C119 | X2Y12 | 0.00000E+00 |
| C121 | Y14 | 0.00000E+00 |
| C123 | X14Y1 | 0.00000E+00 |
| C125 | X12Y3 | 0.00000E+00 |
| C127 | X10Y5 | 0.00000E+00 |
| C129 | X8Y7 | 0.00000E+00 |
| C131 | X6Y9 | 0.00000E+00 |
| C133 | X4Y11 | 0.00000E+00 |
| C135 | X2Y13 | 0.00000E+00 |
| C137 | Y15 | 0.00000E+00 |

Table 17 shows the zoom data.

TABLE 17

| PROJECTION SIZE (INCH) | 50" | 80" | 100" |
|---|---|---|---|
| d5 | 3.802 | 3.622 | 3.556 |
| d11 | 7.242 | 7.423 | 7.489 |
| d24 | 9.023 | 9.622 | 9.782 |
| d31 | 13.299 | 12.700 | 12.541 |
| d36 | 218.379 | 369.918 | 457.250 |

Table 18 shows the single-lens data.

TABLE 18

| LENS NUMBER | FOCAL DISTANCE |
|---|---|
| L1 | 29.49 |
| L2, L3, L4 | −42.15 |
| L5 | 29.42 |
| L6 | −151.46 |
| L7 | 78.91 |
| L8 | −72.64 |
| L9 | 149.64 |
| L10 | 54.04 |
| L11 | −111.56 |
| L12, L13 | 92.40 |
| L14 | −26.58 |
| L15 | 55.45 |

Table 19 shows the lens group data.

TABLE 19

| LENS GROUP | FOCAL DISTANCE |
|---|---|
| G1 | 29.49 |
| G2 | 125.35 |
| G3 | 105.82 |
| G4 | 275.24 |

Other Exemplary Embodiments

As described above, the exemplary embodiment has been described as an example of the technique disclosed in the present application. However, the technique in the present disclosure is not limited to the exemplary embodiment, and can also be applied to embodiments in which change, substitution, addition, omission, and the like are performed. A new exemplary embodiment can also be made by a combination of the components described in the above exemplary embodiment.

The above exemplary embodiment is an illustration of the technique of the present disclosure. Therefore, various changes, replacements, additions, or omissions may be made to the exemplary embodiments within the scope of claims or their equivalents.

INDUSTRIAL APPLICABILITY

The present disclosure can be applied to the projection that projects the image displayed on the image display element. Specifically, the present disclosure can be applied to a projector, a head-up display, and the like.

REFERENCE MARKS IN THE DRAWINGS

10: image projection device
100: projection optical system
110: transmission optical system
120: reflection optical system
121: first mirror
122: second mirror
130: image display element
140: transmission element
A: aperture stop
PB: prism
SC: screen

The invention claimed is:

1. A projection optical system for projecting an image light flux formed in an image display element onto a projection surface, the projection optical system comprising:
   a transmission optical system that is located on an emission surface side of the image display element and includes a stop and a plurality of lenses; and
   a reflection optical system that includes a positive-power first mirror and a second mirror, the first mirror reflecting light output from the transmission optical system, the second mirror reflecting reflected light of the first mirror toward the projection surface,
   wherein Conditional Expression (1) is satisfied $$0 < TL/ft < 5.0 \quad (1)$$

where
   ft is a focal length of the transmission optical system, and
   TL is a distance parallel to an optical axis of the transmission optical system from a position where the first mirror reflects a principal ray of the image light flux, which passes through a center in a long-side direction of the image display element and is projected onto the projection surface closest to a projection optical system side, to the image display element wherein Conditional Expression (4) is satisfied $$0 < T2/T1 < 5 \qquad (4)$$

where
- T1 is a total of a distance from a position of a principal ray of the image light flux reflected by the first mirror farthest from the optical axis in a short-side direction of the image display element to the optical axis and a distance from a position of a principal ray of the image light flux reflected by the second mirror farthest from the optical axis in the short-side direction of the image display element to the optical axis, and
- T2 is an optical path length of the principal ray from a lens located closest to the projection surface among the plurality of the lenses, to the first mirror.

2. The projection optical system according to claim 1, wherein Conditional Expression (5) is satisfied $$0 < T2/ft < 5 \qquad (5).$$

3. The projection optical system according to claim 1, wherein Conditional Expression (6) is satisfied $$0 < T1/ft < 3 \qquad (6).$$

4. The projection optical system according to claim 1, wherein Conditional Expression (7) is satisfied $$0.005 < Tr \times (T1/ft) < 1 \qquad (7)$$

where
Tr is a throw ratio of the projection optical system.

5. The projection optical system according to claim 1, wherein Conditional Expression (8) is satisfied $$0.1 < fmmax/ft < 10 \qquad (8)$$

where
fmmax is a maximum focal length on a surface of the first mirror.

6. The projection optical system according to claim 1, wherein the projection surface has a curvature.

7. An image projection device comprising:
the projection optical system according to claim 1; and
the image display element.

8. A projection optical system for projecting an image light flux formed in an image display element onto a projection surface, the projection optical system comprising:
a transmission optical system that is located on an emission surface side of the image display element and includes a stop and a plurality of lenses; and
a reflection optical system that includes a positive-power first mirror and a second mirror, the first mirror reflecting light output from the transmission optical system, the second mirror reflecting reflected light of the first mirror toward the projection surface,
wherein Conditional Expression (1) is satisfied $$0 < TL/ft < 5.0 \qquad (1)$$

where
- ft is a focal length of the transmission optical system, and
- TL is a distance parallel to an optical axis of the transmission optical system from a position where the first mirror reflects a principal ray of the image light flux, which passes through a center in a long-side direction of the image display element and is projected onto the projection surface closest to a projection optical system side, to the image display element, wherein Conditional Expression (9) is satisfied $$0.001 < fmmin/ft \leq 0.1 \qquad (9)$$

where
fmmin is a minimum focal length on a surface of the first mirror.

9. The projection optical system according to claim 8, wherein Conditional Expression (8) is satisfied $$0.1 < fmmax/ft < 10 \qquad (8)$$

where
fmmax is a maximum focal length on a surface of the first mirror.

10. The projection optical system according to claim 8, wherein the projection surface has a curvature.

11. An image projection device comprising:
the projection optical system according to claim 8; and
the image display element.

* * * * *